(12) United States Patent
Takakura et al.

(10) Patent No.: US 6,981,021 B2
(45) Date of Patent: Dec. 27, 2005

(54) POSITION-LINK CHAT SYSTEM, POSITION-LINKED CHAT METHOD, AND COMPUTER PRODUCT

(75) Inventors: Tetsuo Takakura, Tokyo (JP); Masaomi Sato, Tokyo (JP)

(73) Assignee: ISAO Corporation, Tokyo (JP)

( * ) Notice: Subject to any disclaimer, the term of this patent is extended or adjusted under 35 U.S.C. 154(b) by 693 days.

(21) Appl. No.: 09/851,418

(22) Filed: May 9, 2001

(65) Prior Publication Data

US 2002/0007396 A1    Jan. 17, 2002

(30) Foreign Application Priority Data

May 12, 2000 (JP) ............................. 2000-140563

(51) Int. Cl.[7] ............................................ G06F 15/13
(52) U.S. Cl. ...................... 709/204; 709/219; 709/223; 345/758
(58) Field of Search ................................ 709/204, 219, 709/223; 345/758

(56) References Cited

U.S. PATENT DOCUMENTS

| | | | | |
|---|---|---|---|---|
| 5,793,365 | A | * | 8/1998 | Tang et al. ................. 345/758 |
| 5,926,765 | A | | 7/1999 | Sasaki |
| 6,073,075 | A | * | 6/2000 | Kondou et al. ............. 701/203 |
| 6,151,621 | A | * | 11/2000 | Colyer et al. ............... 709/204 |
| 6,629,136 | B1 | * | 9/2003 | Naidoo ....................... 709/219 |
| 6,665,715 | B1 | * | 12/2003 | Houri .......................... 709/223 |
| 2001/0027378 | A1 | * | 10/2001 | Tennison et al. ........... 701/213 |

FOREIGN PATENT DOCUMENTS

| | | |
|---|---|---|
| EP | 0 700 226 | 3/1996 |
| KR | 2001-0064305 A | 7/2001 |

OTHER PUBLICATIONS

Patent Abstracts of Japan Publication No. 10-257189: Sep. 25, 1998, Patent Application No. 09-056602.
Interface Crossroads: 16 Utilizing Map Database, UNIX Magazine, by Toshiyuki Masui, published from ASCII Inc. in Japan on Mar. 1, 1999; vol. 14, No. 3, pp. 159-170.
Internet Miscellaneous Info, Internet ASCII, by Makoto Ogasawara, published from ASCII Inc. in Japan on Apr. 1, 1999, vol. 4, No. 4, pp. 210-211.
Patent Abstracts of Japan, No. 2001-160022, Jun. 12, 2001.
Boyer D. et al, "Virtual social clubs: meeting places for the Internet Community" Multimedia Computing and Systems, 1999, IEEE International Conference on Florence, Italy, Jun. 7-11 1999, Los Alamitos, Ca., USA, IEEE Comput. Soc, US, vol. 2, 1999, pp. 297-301.

* cited by examiner

*Primary Examiner*—Viet D. Vu
*Assistant Examiner*—Jinsong Hu
(74) *Attorney, Agent, or Firm*—Lowe Hauptman & Berner, LLP (57) ABSTRACT

The position-linked chat system makes it possible to carry out a chat using many terminals connected to a server device through the Internet. The server device includes a chat room controller which generates many chat rooms based on a geographical standard, a chat room selector which selects a chat room in which a user of certain terminal is to participate based on information relating to the current position of that terminal, and a voice controller which mixes voices of users transmitted from the terminals of respective users participating in the same chat room.

14 Claims, 7 Drawing Sheets

| USER ID | TERMINAL ID | TELEPHONE NUMBER | HANDLE NAME | SELF-INTRODUCTION CONTENTS |
|---|---|---|---|---|
| RID0001 | TID0001 | xx-xxxx-xxxx | (SOUND DATA) | (SOUND DATA) |
| RID0002 | TID0002 | xx-xxxx-xxxx | (SOUND DATA) | (SOUND DATA) |
|  |  |  |  |  |

FIG.4

| TERMINAL ID | CURRENT POSITION INFORMATION 1 | | | CURRENT POSITION INFORMATION 2 | | |
|---|---|---|---|---|---|---|
| | LATITUDE | LONGITUDE | TIME | LATITUDE | LONGITUDE | TIME |
| TID0001 | X△○" | XX△" | 15:30 | X△○" | XX△" | 15:31 |
| TID0002 | X○△" | XX○" | 16:12 | X○△" | XX○" | 16:13 |
| | | | | | | |

FIG.5

| DISTANCE BETWEEN TERMINALS [m] | SOUND VOLUME CONTROL VALUE |
|---|---|
| 0~10 | 100 |
| 10~20 | 90 |
| 20~30 | 80 |
| | |

POSITION-LINK CHAT SYSTEM, POSITION-LINKED CHAT METHOD, AND COMPUTER PRODUCT

FIELD OF THE INVENTION

The present invention relates to a technology with in which a plurality of users can carry out a chat while moving using their terminals.

BACKGROUND OF THE INVENTION

Conventionally, various systems have been proposed for enabling persons at far distances to directly communicate with each other.

Among such systems, wire telephones, radio communications and mobile communications have been used most widely. In the wire telephones, it is possible to carry out communications using a plurality of telephones connected to exchanges with wire. In the radio communications, it is possible to carry out communications based on a direct transmission and reception of signals among a plurality of radio devices. In the mobile communications, it is possible to carry out communications using mobile communication terminals like portable telephones and PHSs (Personal Handy Phone) that are connected to exchanges by radio. These systems are common in that they are communication means based on voice, and that the communication parties are limited.

Further, as new communication systems distributed along the development of Internet technology in recent years, there are the electronic bulletin board system and the chat system. These are the systems in which a plurality of persons can interactively write and read sentences on Web pages stored in a server device using client devices connected to the server device via the Internet. Particularly, in the case of the chat system, the sentence display screen is updated in a relatively short time. Therefore, this has a certain level of real-time nature, and is excellent as a virtual interactive space. This chat system is different from the above mobile communication system and others in that generally the chat system is communication means based on characters, and that the dialogue is carried out between an unspecified number of the general public. The other party of the dialogue is not necessarily specified.

These conventional systems further have the following characteristics.

First, a plurality of persons can carry out mutual communications in the meeting telephone as a kind of a wire telephone, the radio communication, and the chat. For example, in the meeting telephone and the radio communications, a plurality of persons can mutually listen to their speeches. In the chat, a plurality of persons can write or look at the contents substantially at the same time.

Further, in the radio communications and the mobile communications, persons can communicate with each other while moving. In other words, in the radio communications, users can carry out conversations while walking or moving in a car or the like within a range in which it is possible to transmit/receive waves between radio devices. In the mobile communications, users can also carry out conversations while moving, within a range in which it is possible to transmit/receive waves between mobile communication terminals and the exchange.

Further, in the case of a car navigation system in which it is possible to read map information or the like in a mobile unit like an automobile, though this is not communications between persons, it is possible to present various kinds of information to the moving persons.

In the actual communications, there are many cases where a plurality of persons carry out conversations while moving. For example, such conversations are carried out between friends while they are walking in the town, or when family members are driving in one automobile. Through such communications, it is possible to spend the moving time more pleasantly and meaningfully.

However, among the conventional systems, only the radio communication system enables a plurality of persons to carry out communications while moving. Other systems cannot satisfy this requirement. Further, in the radio communication system, there is a limit to a range in which radio waves can reach. Therefore, when the moving range is wide, it becomes impossible to carry out communications.

In the case of carry out conversations while moving, more interesting communications can be achieved when it is possible to change the contents of the communications according to the current position of the user. For example, when it is possible to talk on various background scenes that change along the move, or when it is possible to obtain detailed knowledge from persons familiar with these places, the communications become more interesting.

However, of the conventional systems, only the car navigation system provides information of different contents according to the position of the user. Other systems cannot satisfy this requirement. However, the car navigation system is not the communication means between persons as described above, and it is impossible to achieve bidirectional communications.

There have also been proposed conventional systems that relate a position of a dialogue party to the contents of communications.

For example, according to Japanese Patent Application Laid-Open No. 9-23275, when a user itself has moved in a virtual space, and when that movement is small or when fields of vision are superimposed, voices of both parties are connected to the same voice mixer. Thus, the voice that each user can listen to changes according to the position of the user. Further, according to Japanese Patent Application Laid-Open No. 5-113941, a weight is placed on a reach range of a message of a user within a virtual space, and the weighted message is transmitted. Thus, a reach range of a message changes for each message.

However, these systems are for users who are virtually set in a virtual space to carry out communications. These systems do not assume the move of real persons in a real space. For example, these systems are structured based on the assumption that a user inputs a position of a self into the system. However, in reality, it is impossible for a user moving in the town to sequentially input the position of the self. Therefore, it is not possible to directly use these systems for communications in the real world.

Further, these systems are structured such that communications can be established within a constant range around a virtual position of the user. However, this can become an inconvenience. For example, according to these conventional systems, when two users A and B are in the same area C, they can have a dialogue when the distance between them is short, but they cannot have a dialogue when the distance is long. However, in the case of having a dialogue on the area C, for example, it is convenient when the dialogue is established so long as they are within the area C, regardless of a distance between the two persons. In other words, it is preferable to be able to establish communications within a range divided based on other concept than the positions of the users.

From the above, the conventional systems have still many problems as systems that change the contents of communication according to the current position of the user.

In recent years, there has also been an increasing requirement for achieving communications among an unspecified number of the general public. For example, when it is possible to frankly talk to various people walking around while walking in the town, it is possible to obtain information by accident that has not been known or to meet persons who have not been known by chance. Such accidental occurrence in communications cannot be obtained in the above conventional communication systems at all. In the mean time, this is a most interesting element for the user.

However, among the above conventional systems, only the chat system can provide accidental communications with an unspecified number of the general public. Other systems cannot satisfy this new requirement.

SUMMARY OF THE INVENTION

It is an object of the invention to provide a technique capable of achieving communications with an unspecified number of the general public based on the contents according to move positions of a plurality of persons while moving.

According to the present invention, a chat can be carried out using a plurality of terminals connected to a server device through a network. The server device generates a plurality of chat rooms divided based on a geographical standard related to the current position of each user; selects a chat room in which a user at a terminal is to participate, based on information relating to the current position of the terminal posted from each terminal; and mixes voices of users transmitted via terminals of respective users who participate in the same chat room selected at the step of selecting a chat room.

Other objects and features of this invention will become apparent from the following description with reference to the accompanying drawings.

DESCRIPTION OF THE PREFERRED EMBODIMENTS

Preferred embodiments of a position-linked chat system relating to the present invention (hereinafter to be referred to as the present system), a position-linked chat method therefor (hereinafter to be referred to as the present method), and a computer-readable recording medium recorded with a program (hereinafter to be referred to as the present medium) will be explained in detail below with reference to the drawings. These embodiments do not limit the present invention.

Figure 1:
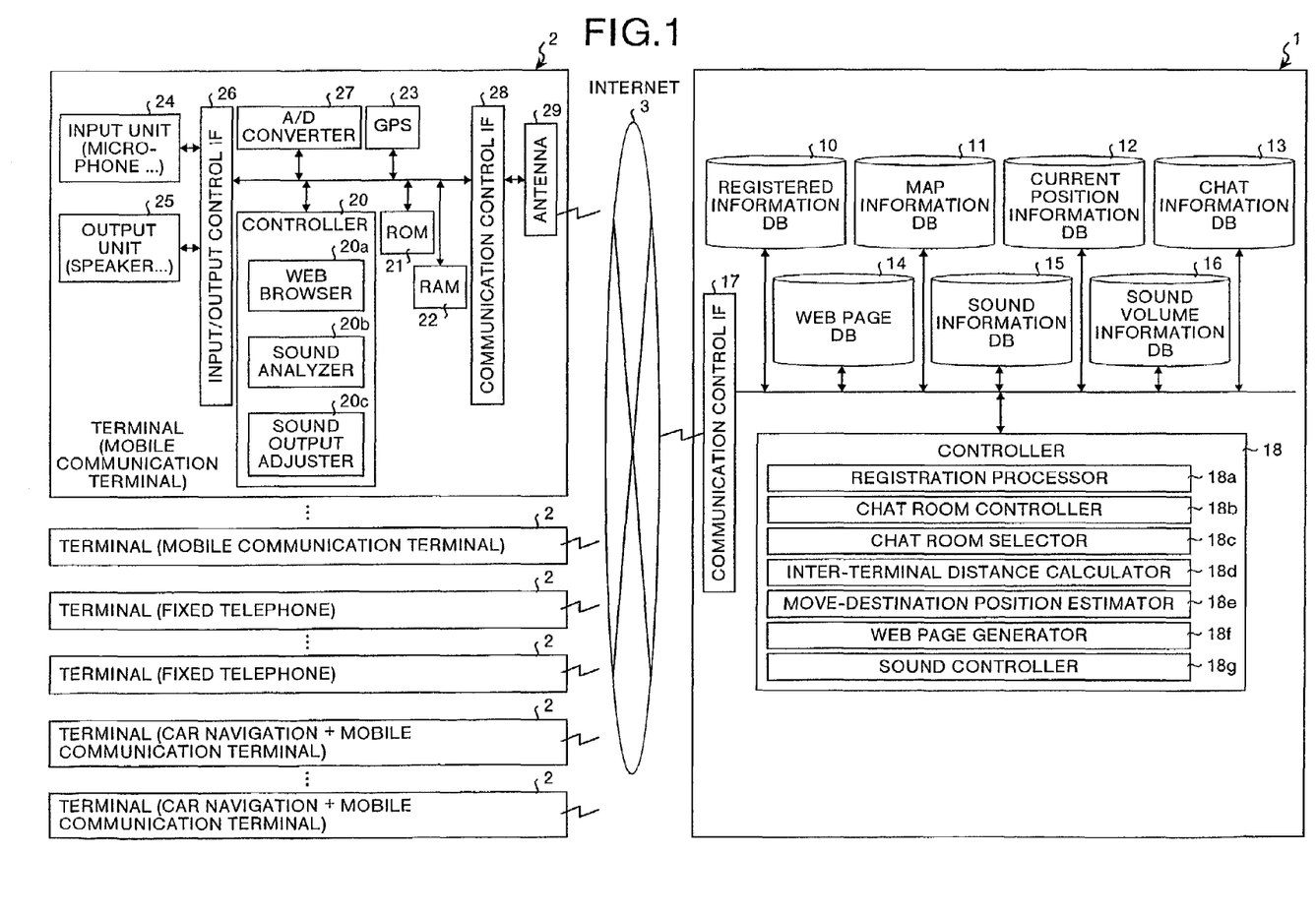
FIG. 1 is a block diagram showing the whole present system relating to an embodiment.

FIG. 1 is a block diagram showing the whole present system relating to this embodiment.

AS shown in FIG. 1, the present system consists of server device 1 and plurality of terminals 2 connected to each other via the Internet 3 to make it possible to carry out communications. The outline of the service provided by the present system will be explained, and thereafter, details of the structure and the processing of the present system will be explained.

Outline of the Service:

A user registered as a member of the present system can chat with other users using an own terminal 2.

The terminal 2 is for transmitting/receiving at least voice. Specifically, as shown in FIG. 1, the terminal 2 includes a mobile communication terminal like a portable telephone and a PHS, a fixed telephone like a public telephone and a home telephone, and a combination of a car navigation with a mobile communication terminal. Although not shown in the drawing, it is also possible to combine a personal computer (particularly, a notebook type computer suitable for carrying) with a mobile communication terminal. Alternately, it is also possible to combine a personal computer with a home telephone. The terminal 2 is structured to be able to transmit information (information on the current position) for specifying the current position of the self. This point will be described later.

The chat is a service for carrying out a dialogue between users in a virtual dialogue space (hereinafter to be referred to as a chat room), as has been conventionally known. Particularly, the chat in the present system is based on a voice chat for carrying out a dialogue in voice in consideration of the convenience and safety at the time of having a dialogue while the users are moving. However, when the terminal 2 equipped with a monitor is utilized, it is also possible to use a character chat as well for having a dialogue in text data.

In the present system, a geographical area in which each terminal 2 can exist is divided into a plurality of areas according to a predetermined geographical division standard. A plurality of chat rooms corresponding to the divided areas are generated. For example, Tokyo-to is divided into Shibuya-ku, Shinjuku-ku, etc. Then, a chat room corresponding to Shibuya-ku and a chat room corresponding to Shinjuku-ku are generated respectively. A user of each terminal 2 can participate in a chat room corresponding to the area in which the current position of the own terminal 2 (=the current position of the self) is included. The user can have conversations with persons within this area. For example, a user at the Shibuya station can participate in a chat room corresponding to Shibuya-ku, and can have conversations with persons within Shibuya-ku.

When a user has moved and the current position has changed, the chat room is changed automatically. For example, when a user has moved from the Shibuya station to the Shinjuku station, the chat room corresponding to Shibuya-ku is changed to the chat room corresponding to Shinjuku-ku. Therefore, a user can always participate in the chat room corresponding to the current position of the self.

The present system provides communications with further variations based on the above mode. The contents of the variations will be described later.

Outline of the Service—Division Standard of Chat Room:

The geographical division standard for generating a chat room will be explained below. It is preferable that this geographical division standard is determined so that the number of users participating in each chat area becomes a suitable number. For this division standard, it is possible to employ a division standard by prefecture, and a division standard by city or town, as a standard based on the address notation. For example, when a division standard by city or town is employed, a chat room is generated like a "chat room of Shibuya-ku" or a "chat room of Shinjuku-ku" as described above (hereinafter, a chat room divided based on a division standard by city or town will be called a wide-area chat room). In addition, it is also possible to employ a division standard based on a trunk road or a railway track that extends to a plurality of cities or towns. In this case, it is possible to generate a chat room like a "chat room of a metropolitan highway" or a "chat room of Yamanote line". It is also possible to divide a chat room based on an optional geographical standard.

Further, it is possible to structure a chat room as a hierarchical chat room with mutually different ranges and with a mutual superimposition.

For example, it is possible to generate a chat room of a relatively narrow range based on a division standard of a geographical mark (a landmark) included in each city or town, in addition to a chat room of a relatively wide area based on the division standard by city or town. For example, when there is a "chat room for Shibuya ward", it is possible to further structure a "chat room for around the Shibuya station", a "chat room for around the Harajuku station", or a "chat room for around the Yoyogi park" (hereinafter, a chat room divided based on a division standard of a landmark will be called a medium-area chat room).

Further, it is possible to generate a chat room of a further hierarchical narrow area using a division standard of a purpose of communications of each user, in addition to the above geographical division standard. For example, when there is a "chat room for around the Shibuya station", it is possible to further structure a "chat room for exchanging restaurant information (around the Shibuya station)" or a "chat room for inviting friends (around the Shibuya station)" (hereinafter, a chat room divided based on a division standard of a purpose will be called a narrow-area chat room).

Figure 2:
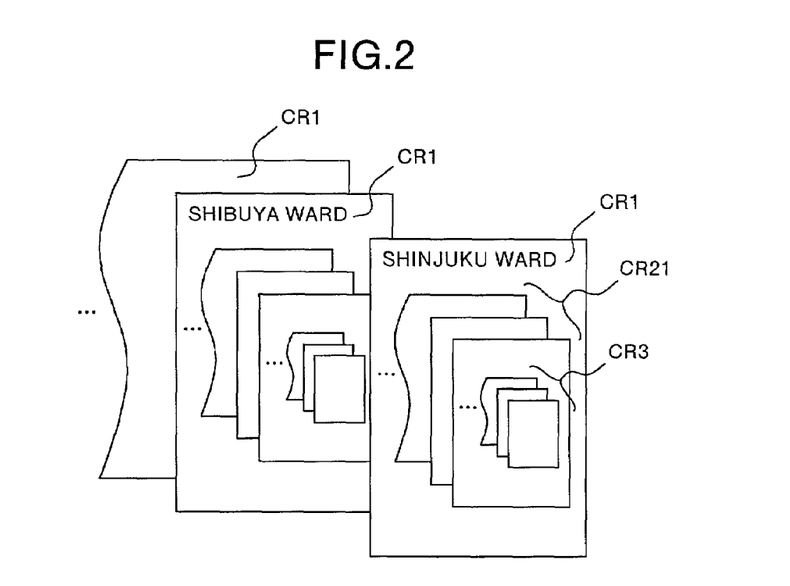
FIG. 2 is a diagram showing a structure of a chat room.

FIG. 2 is a diagram showing a structure of a chat room generated in the present embodiment. As shown in FIG. 2, in the present embodiment, a wide-area chat room CR1, a medium-area chat room CR2, and a narrow-area chat room CR3 will be generated.

It is preferable that a plurality of chat rooms divided based on the same division standard are generated without a gap between the chat rooms. Particularly, it is preferable that the move range of the terminal 2 is covered without a leakage in the highest-level hierarchy (the widest hierarchy, for example, a wide-area chat room). However, there may be a gap between chat rooms in the case of a chat room in a relatively low-level hierarchy (a relatively narrow-area hierarchy, for example, a medium-area chat room and a narrow-area chat room) For example, when there are the above "chat room around the Shibuya station" and the "chat room around the Harajuku station", a medium chat room corresponding to an intermediate position between the periphery of the Shibuya station and the periphery of the Harajuku station is not always necessary. This position can be covered by the higher-level "chat room of Shibuya ku".

A method of selecting a chat room for each user to participate in from among a plurality of chat rooms gener- ated in this way will be explained below. For this method, an optional method capable of selecting one or more chat rooms based on at least the current position of each terminal 2 is employed. However, the method is not limited to one. It is also possible to provide a plurality of selection methods, and a selection method itself may be selected automatically or manually.

In the present embodiment, each user can select a "selection based on the current position", a "selection based on destination position after or during movement", and a "manual selection" as a selection method. Among the above methods, in the "selection based on the current position" and the "selection based on destination position after or during movement", a chat room is selected automatically based on the current position of each terminal 2. Specifically, in the "selection based on the current position", a "wide-area chat room" corresponding to the current position of each terminal 2 is automatically selected. In the "selection based on destination position after or during movement", destination of each terminal 2 is estimated based on a change in the current position of this terminal. Then, a "wide-area chat room" corresponding to this move destination is automatically selected.

On the other hand, in the "manual selection", each user can freely select a "wide-area chat room", a "medium-area chat room", or a "narrow-area chat room". Based on the selection of this "manual selection", each user can select a chat room in an optional area regardless of the current position of the self, and can participate in this selected chat room. For example, a user in Shinjuku-ku can select and participate in the "chat room of Shinjuku-ku".

However, there are various other methods of selecting a chat room. For example, it is possible to obtain information on the attributes of habit, personal history, etc. of each user, and to automatically select a chat room in which the user is most interested or most relevant, based on this attribute information.

System Structure of the Server Device:

A structure of the present system for carrying out the above chat will be explained below.

First, the server device 1 will be explained. In FIG. 1, the server device 1 schematically consists of a registered information DB (DB=database) 10, a map information DB 11, a current position information DB 12, a chat information DB 13, a Web page DB 14, a sound information DB 15, a sound volume information DB 16, a communication control IF (IF= interface) 17, and a controller 18. These sections are connected to each other via a communication path like a bus to make it possible to carry out communications. The server device 1 is further connected to the Internet 3 via a communication unit and an exclusive line like a router not shown to make it possible to carry out communications.

Figure 3:
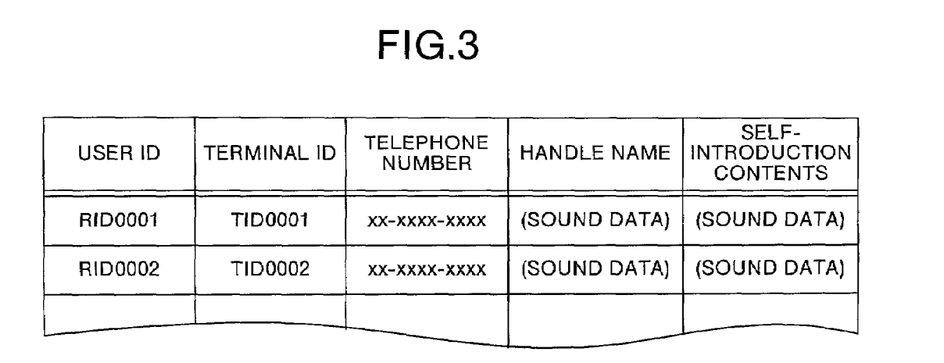
FIG. 3 is a diagram showing an example of a structure of information stored in a registered information DB.

Information (registered information) on each user who has become a member of the present system is stored in the registered information DB 10 out of the constituent elements of the server device 1. As shown in FIG. 3, for example, this registered information consists of a user ID for uniquely identifying each user, a terminal ID for uniquely identifying each terminal 2, a telephone number of the terminal 2 of each user, a nickname (handle name) of each user on the present system, and self-introduction contents of each user, by relating the information to each other. The handle name and the self-introduction contents are stored in sound data in the AIFF (Auto Interchange File Format) so that the voice can be output to the terminal 2.

Further, the map information DB 11 stores information (map information) on a map of an area in which each user can exist. For example, when the present system is utilized in only Japan, this map information is structured as information on the map of Japan. Detailed contents and a data format of this map information are optional. However, this is structured as the information which makes it possible to select a chat room in which a user of the terminal 2 is to participate in, at least based on the current position information (for example, the latitude and the longitude of the terminal 2) transmitted from each terminal 2.

Figure 4:
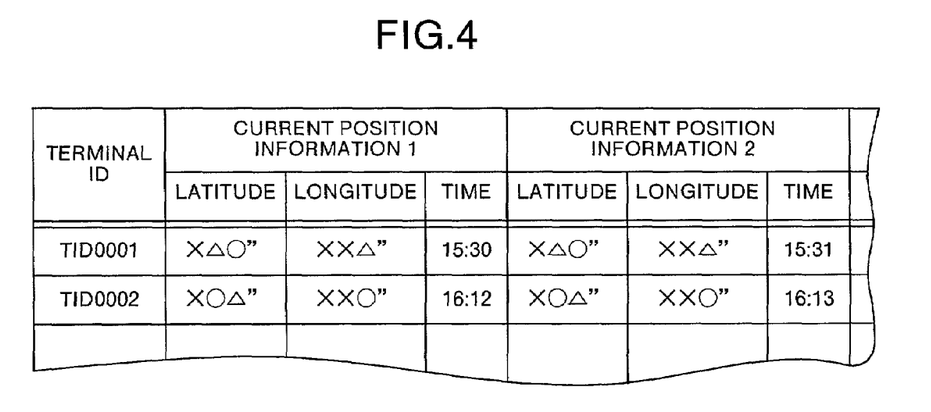
FIG. 4 is a diagram showing an example of a structure of information stored in a current position information DB.

Further, the current position information DB 12 stores the current position information transmitted from the terminal 2 of which connection to the server device 1 has been established, and the information obtained attached to this current position information. For example, as shown in FIG. 4, the information stored in the current position information DB 12 consists of a terminal ID, a plurality of latitudes and longitudes transmitted from each terminal 2 and obtained at a predetermined interval, and a time of obtaining each latitude and longitude, by relating the information to each other.

Further, the chat information DB 13 stores information (chat information) relating to each chat room generated within the present system. For example, this chat information consists of each chat room name, and a chat room ID of a wide-area chat room, a medium-area chat room, and a small-area chat room currently generated respectively, and a terminal ID of a user currently participating in each chat room, by relating the information to each other.

Further, the Web page DB 14 stores various kinds of Web page data transmitted to the terminal 2. The Web page data includes Web page data for carrying out a character chat and a character bulletin board. This Web page data is described and stored in, for example, a compact HTML as a language for describing a page for a mobile communication terminal, or its modified description language, WML (Wireless Markup Language), or HDML (Handled Device Markup Language). This Web page data is added with various kinds of information according to the needs by a Web page generator 18*f* to be described later, and the information is transmitted to the terminal 2.

Further, the sound information DB 15 stores various kinds of sound data transmitted to the terminal 2. This sound data includes sound data of guide voice for guiding a chat utilization method. This sound data is stored in the AIFF (Audio Interchange File Format), for example.

Figure 5:
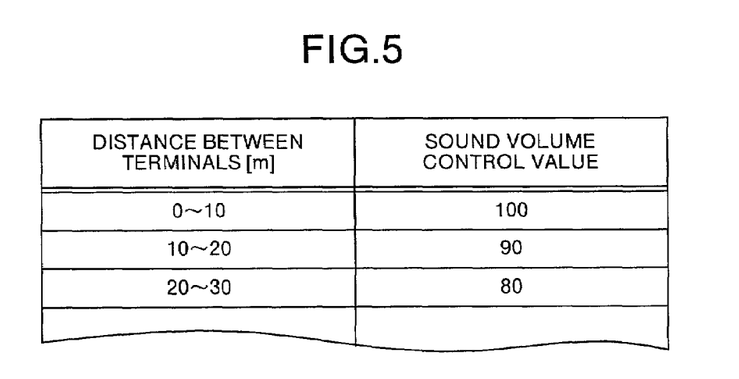
FIG. 5 is a diagram showing an example of a structure of information stored in a sound volume information DB.

Further, the sound volume information DB 16 stores information on the sound volume of various kinds of sound data transmitted to the terminal 2. For example, as shown in FIG. 5, the sound volume information DB 16 stores a distance between the terminals 2, and a sound volume control value to be added to the sound data transmitted to each terminal 2, by relating the information to each other. The sound volume control value is determined such that the sound volume becomes relatively small when there is a long distance between the terminals 2, and the sound volume becomes relatively large when there is a short distance between the terminals 2.

Then, the communication control IF 17 carries out a communication control between the server device 1 and the Internet 3 (or the communication device like a router).

Next, the controller 18 will be explained. The controller 18 is for controlling each section of the server device 1. The controller 18 consists of a registration processor 18*a*, a chat room controller 18*b*, a chat room selector 18*c*, an inter-terminal distance calculator 18*d*, a move-destination position estimator 18*e*, a Web page generator 18*f*, and a sound controller 18*g*. The outline of the function of each section will be explained here, and detailed processing of each section will be described later.

Of these sections, the registration processor 18*a* carries out a registration processing for each user to become a member of the present system, and a log-in processing for each user to log in to utilize the present system.

Further, the chat room controller 18*b* is a chat room control unit which generates a plurality of chat rooms according to the needs, and combining or dividing chat rooms according to the needs. Further, the chat room selector 18*c* is a chat room selecting unit which selects a chat room for each user to participate in among the plurality of chat rooms generated by the chat room controller 18*b*.

Further, the inter-terminal distance calculator 18*d* is an inter-terminal distance calculating unit which calculates a distance between the terminals 2 based on the current position information posted from each terminal 2. Further, the move-destination position estimator 18*e* is a move-destination position estimating unit which estimates a position of a move destination of a user based on a change in the current position information posted from each user 2.

Further, the Web page generator 18*f* obtains Web page information from the Web page DB 14 according to the needs, and adds necessary information to this Web page information, thereby to generate a Web page for transmission to the terminal 2. This Web page can be dynamically generated using, for example, CGI (Common Gateway Interface). Then, the sound controller 18*g* is a sound control unit which mixes together the voices transmitted through terminals 2 of the users participating in the same chat room.

The above explains the structure of the server device 1. Each constituent element shown in the drawings shows a concept of the function, and it is not always necessary to physically structure these elements as shown in the drawings.

For example, of the control functions of the server device 1, the whole or an optional part of the functions can be realized by a CPU (Central Processing Unit) or based on a program that is interpreted and executed by the CPU. It is also possible to realize them as hardware based on a wired logic.

Further, a detailed mode of decentralization and combination of the server device 1 is not limited to that shown in the drawings. It is also possible to decentralize or combine functionally or physically the whole or a part of the server device 1 in an optional unit according to various loads. For example, it is possible to combine the map information DB 11 and the current position information DB 12 into one database. It is also possible to make each DB of the server device 1 independent as a database server, and to integrally manage the databases. As functions of structuring the actual server device 1, it is also possible to further add functions of a firewall server and a DNS (Domain Name System) server. These can be structured in a conventional manner, and therefore, their explanation will be omitted.

System Structure of the Terminal:

A structure of the terminal 2 will be explained next. As explained above, the terminal 2 has a basic structure of a mobile communication terminal like a portable telephone and a PHS, a fixed telephone like a public telephone, and a combination of a mobile communication terminal with a car navigation. The terminal 2 is structured with further additional necessary functions. Functions common to each terminal 2 will be extracted and explained below.

As shown in FIG. 1, as an outline, this terminal 2 consists of a controller 20, a ROM 21, a RAM 22, a GPS (Global Positioning System) 23, an input unit 24, an output unit 25, an input/output control IF 26, an A/D converter 27, a communication control IF 28, and an antenna 29. These sections are connected with each other with a bus to make it possible to carry out communications.

Of these sections, the controller 20 is for controlling each part of the terminal 2, and consists of a Web browser 20a, a sound analyzer 20b, and a sound output adjuster 20c.

Of these, the Web browser 20a is for carrying out a display control by obtaining data of the Web page from the server device 1 via the Internet 3, interpreting the data, and making the output unit 25 display the Web page, based on the input URL (Uniform Resource Locator). For this Web browser 20a, it is possible to use a Web browser for a mobile communication terminal that is structured in a simpler format than the Web browser for a personal computer.

Further, the sound analyzer 20b analyzes the voice of each user input via the input unit 24. When the contents of this voice are a predetermined voice command, the sound analyzer 20b outputs a control signal corresponding to this voice command.

The sound output adjuster 20c controls a sound output of the sound data transmitted from the server device 1. Specifically, the sound output adjuster 20c analyzes the header of sound data transmitted from the server device 1, reads a sound volume control value included in this header, and determines the output sound volume of the voice. Then, the sound output adjuster 20c controls the amplification of a sound amplifier not shown so that the voice is output according to the determined output sound volume.

The whole or an optional part of this controller 20 can be realized by the CPU or based on a program that is interpreted and executed by the CPU. In other words, the ROM 21 stores a computer program for giving an instruction to the CPU to carry out various kinds of processing in co-operation with the OS (Operating System). This computer program is executed by being loaded on the RAM 22, and constitutes the controller 20 in co-operation with the CPU. However, this computer program may be stored in the application program server device 1 connected to the terminal 2 via an optional network. Depending on the needs, it is also possible to download the whole or a part of this program. It is also possible to realize the whole or an optional part of the controller 20 as hardware based on a wired logic.

In FIG. 1, the GPS 23 measures the current position (latitude and the longitude) of the terminal 2 based on a wave received from a satellite not shown. However, when it is possible to specify the current position of each terminal 2 with the server device 1, it is possible to omit this GPS 23. For example, when the terminal 2 is a PHS, it is possible to specify the current position of the PHS with the server device 1 based on a time difference of arrival times when the wave transmitted from the PHS reaches a plurality of base stations. It is also possible to utilize the position information of a PHS registered in each base station for receiving waves to the PHS. When the terminal 2 is a fixed telephone, it is possible to specify the position of the fixed telephone at the telephone station side based on the telephone number of the fixed telephone. Therefore, when the server device 1 can obtain such position information from the base station, it is possible to omit the GPS 23 of the terminal 2.

The input unit 24 is structured to have at least a microphone (or a hand-free microphone), and can also use a push-button and the like together.

The output unit 25 includes at least a speaker, and can also use a monitor. The input unit 24 and the output unit 25 are connected to the controller 20 via the input/output control IF 26.

The A/D converter 27 converts an analog signal input from the microphone into a digital signal, or converts a digital signal from the controller 20 into an analog signal for output to the speaker.

Further, the antenna 29 carries out a radio communication to the server device 1 via the communication control IF 28. However, when the terminal 2 is a fixed telephone, it is possible to omit the antenna 29.

The terminal 2 as explained above is connected to the Internet 3 via a gateway server or the like not shown provided at a base station or a relay station not shown, for example. The terminal 2 can make access to the server device 1 according to a predetermined communication rule (for example, the TCP/IP (transport control protocol/internet protocol) or the WAP (Wireless Application Protocol)).

Figure 6:
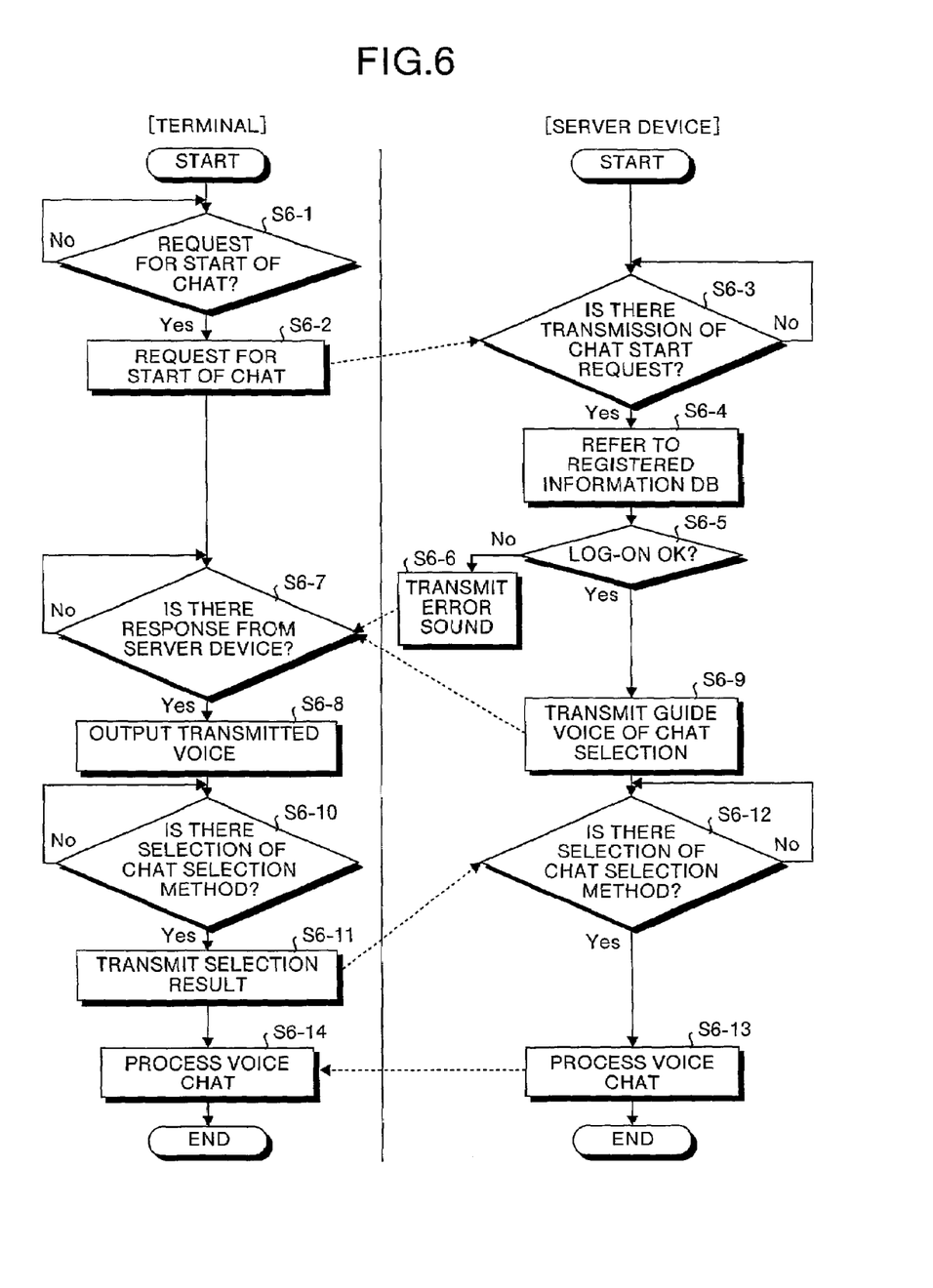
FIG. 6 is a main flowchart of a chat processing.

Next, how chat is performed in the present system will be explained. FIG. 6 shows a main flowchart of the chat processing.

First, a log-in processing for carrying out the log-in authentication of a user will be explained.

A user carries out a member registration for joining the present system at an optional timing (generally, when the user has accessed the server device 1 first time). This member registration can be carried out based on an optional method. When each user has input a handle name and self-introduction contents via the input unit 24 at the terminal 2, the controller 18 of the server device 1 obtains a telephone number included in the transmission signal from the terminal 2, and gives a user ID. These pieces of information are stored in the registration information DB 10.

Thereafter, the user can instruct a start of a chat via the terminal 2. Specifically, after a dial-up connection to the Internet 3 has been carried out, a "chat start" is voiced to the microphone. Then, the sound analyzer 20b analyzes this voice. A predetermined URL for requesting the present system to start a chat is transmitted via the communication control IF 28 based on a predetermined communication rule. The request for starting the chat is made to the server device 1 based on the routine of this URL (steps S6-1, S6-2). In place of the voice command, it is also possible to select the chat starting via a menu screen not shown displayed on the monitor of the terminal 2.

The server device 1 monitors presence or absence of a transmission from the terminal 2 (step S6-3). Upon receiving a transmission, the controller 18 analyzes the transmitted contents. Depending on the result of the analysis, the processing shifts to each section of the controller 18. When the transmission contents is a request for starting the chat, the server device 1 makes a decision about whether it is possible to log in to the present system or not, under the control of the registration processor 18a. In other words, the server device 1 refers to the registered information DB 10 (step S6-4), and makes a decision about whether the telephone number of the terminal 2 that has transmitted the request for starting the chat has been registered in the registered information DB 10 or not.

When a decision has been made that the telephone number has not been registered, the server device 1 decides that it is not possible to log in (step S6-5). Then, the server device 1 obtains sound data of voice for transferring a log-in error and voice for urging the registration from the sound information DB 15, and transmits this to the terminal 2 (step S6-6). Then, the terminal 2 receives the sound data from the server device 1 via the communication control IF 28, converts this sound data into an analog signal by the A/D converter 27, and outputs the converted result in voice to the speaker (steps S6-7, S6-8). The transmission of various kinds of requests from the terminal 2 to the server device 1, the transmission of various kinds of data from the server device 1 to the terminal 2, and the sound output at the terminal 2 are carried out substantially in a similar manner in the following steps. Therefore, in the following, the explanation of such common processing will be omitted.

How a chat room is selected will be now explained. When a decision has been made that the telephone number of the terminal 2 that has transmitted the request for starting the chat has not been registered in the registered information DB 10, the server device 1 decides that it is possible to log in, and shits to the next processing (step S6-5). The server device 1 obtains the sound data of guide voice for selecting a chat selection method (for example, "Select a chat selection method.") from the sound information DB 15, and transmits this sound data to the terminal 2 (step S6-9). This guide voice is output from the speaker of the terminal 2 (steps S6-7, S6-8). Then, the user gives a voice command of any one of the "selection based on the current position", the "selection based on destination position after or during movement", and the "manual selection". The sound analyzer 20*b* analyzes this voice. Then, the information for specifying the chat selection method is transmitted to the server device 1 (steps S6-10 to S6-12). Thereafter, the chat selected by this selection method is carried out until when the user instructs to finish the chat (steps S6-13, S6-14).

Figure 7:
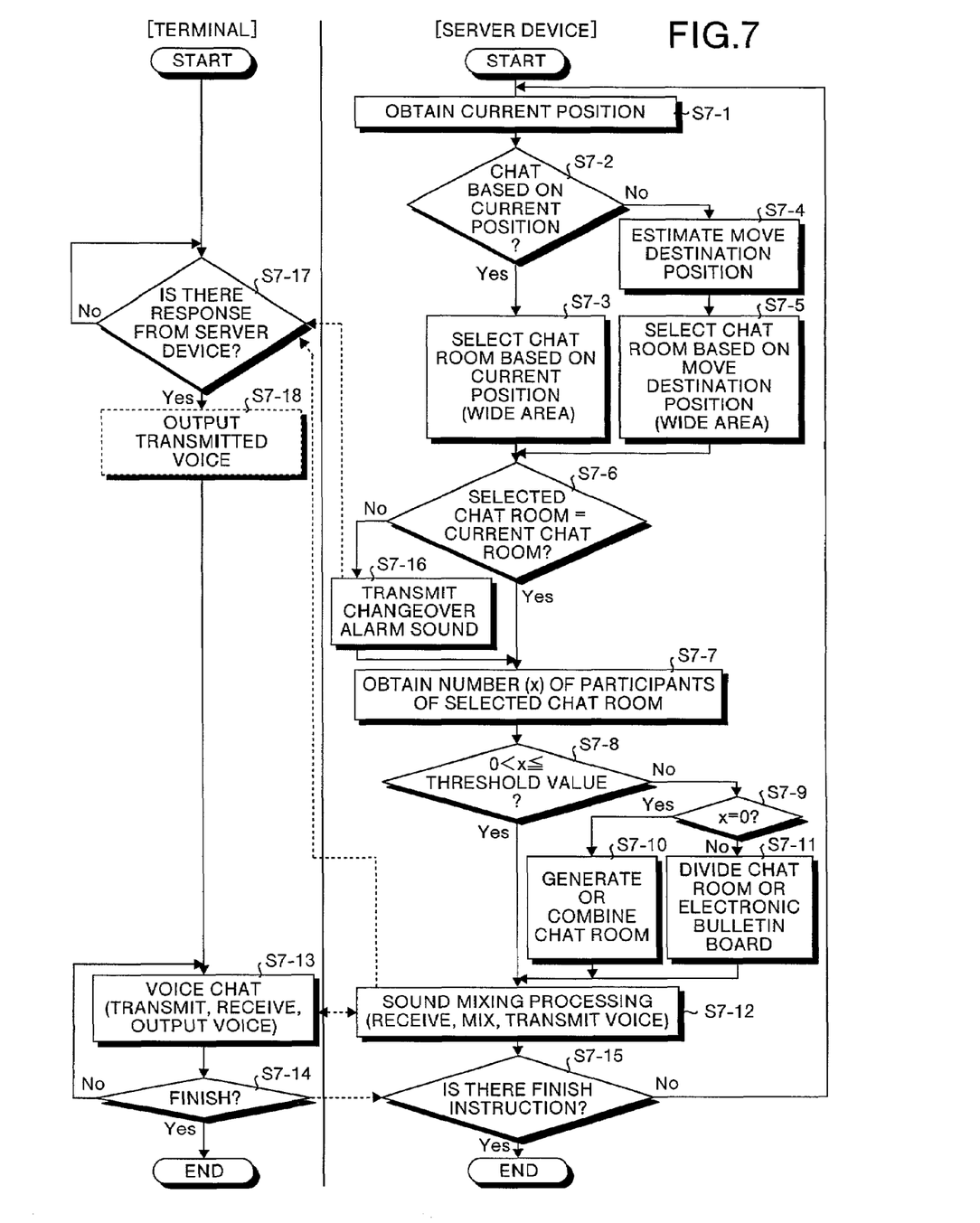
FIG. 7 is a flowchart of a chat processing in the case of an automatic selection of a chat room.

How a chat room is automatically selected will now be explained. First, a case that the "selection based on the current position" or the "selection based on destination position after or during movement" has been selected will be explained. FIG. 7 is a flowchart of a chat processing in the case of an automatic selection of a chat room.

First, the current position of the terminal 2 (=current position of the user) is obtained (step S7-1). Specifically, while each terminal 2 is communicating with the server device 1, position information is continuously transmitted from each terminal 2. The current position obtained in this case is stored in the current position information DB 12.

How a chat room is automatically selected based on the current position will now be explained. While the "selection based on the current position" has been selected, the chat information DB 13 is referred to, and a wide-area chat room generated corresponding to the area that includes the current position of the terminal 2 is selected (steps S7-2, 7-3). For example, when the current position of the terminal 2 is "- - - in front of Shibuya-ku Jingumae", the "chat room of Shibuya-ku" is selected.

How a chat room is automatically selected based on destination position after or during movement will now be explained. When the "selection based on destination position after or during movement" has been selected, the move destination position estimator 18*e* estimates a move destination position of the terminal 2 (step S7-4).

Specifically, the move destination position estimator 18*e* reads the current positions of the terminal 2 and the time of obtaining the current positions so far stored in the current position information DB 12, and calculates a direction of a change in the current positions and the speed of the change (However, at the initial time of the chat, a plurality of current positions do not exist, and therefore, it is not possible to estimate a move destination of the terminal 2. Therefore, in this case, a chat room is selected based on the current position, in a similar manner to that at step S7-3.).

For example, a direction of a change in the current position may be determined as a direction from the current position obtained at the first time to the current position obtained at the last time. Alternately, it is also possible to apply a displacement vector between the current position obtained at the last time and the current position obtained at the time before the last. Further, for determining a direction of a change in the current position, it is also possible to take into consideration the map information stored in the map information DB 11. For example, when the track of the current positions coincides with a trunk road like a highway or a national road, a proceeding direction of this trunk road may be estimated as a direction of a change in the current positions.

Further, a change speed may be determined as an average value of the time of obtaining the current position at the first time and the time of obtaining the current position at the last time. Alternately, a change speed may be determined as an average value of the time of obtaining the current position at the last time and the time of obtaining the current position at the time before the last.

When a direction of a change in the current positions and a change speed have been calculated in the manner as described above, a move destination position to which the terminal 2 moves next is calculated. Then, the chat information DB 13 is referred to, and a wide-area chat room generated corresponding to the area including the move destination position of the terminal 2 is selected (step S7-5). For example, when the current position of the terminal 2 is Shibuya-ku, and also when the move destination position is Shinjuku-ku, the "chat room of Shinjuku-ku" is selected. As it is possible to participate in a chat room based on the estimated move destination, it is possible to obtain information like traffic congestion information of the destination area. Depending on the status, the communication becomes more useful.

Next, how a final determination of a chat room is made will be explained. When a decision is made about whether a chat room selected in this way is a chat room in which the user is currently participating or not (step S7-6. However, at the initial time of the chat, there is no chat room in which the user is participating. Therefore, in this case, this decision is skipped).

Then, by referring to the chat information DB 13, a current number of participants x in the selected chat room is obtained. A chat room in which the user is to participate is finally determined based on this number x of the participants and a large/small relationship with a predetermined threshold value. This threshold value is a maximum number of persons who can participate in one chat room, and this is determined by taking into consideration the number of voices each user can listen to in the voice chat.

First, when $0 < x \leq$ the predetermined threshold value (step S7-8), the selected chat room already exists, and it can be decided that a user can participate in this chat room. Therefore, this chat room is finally determined as a chat room in which the user is to participate.

On the other hand, when x=0 (step S7-9), it can be decided that there is no user participating in the selected chat room (this chat room is not currently generated). In this case, the chat room generator generates a new chat room (stepS7-10). Then, this new chat room is finally determined as a chat room in which the user is to participate.

However, even when a new chat room has been generated, there may not be any other conversation partner immediately after the generation. Therefore, in place of the generation of the chat room, the chat room may be combined (step S7-10).

In other words, this selected chat room (for example, the chat room of Shibuya-ku) may be combined with a chat room (for example, the chat room of Chiyoda-ku) having a relatively small number of participants among wide-area chat rooms in the areas adjacent to the area of this chat room. Thus, one chat room (a chat room common to Shibuya-ku and Chiyoda-ku) may be structured.

Further, when x is not equal to zero (that is, x>the predetermined threshold value) at step S7-10, the selected chat room already exists. However, it can be decided that when the user participates in this chat room, the number of participants becomes too large. Therefore, the chat room is divided (step S7-11). Specifically, a new chat room corresponding to the same area is generated, and some users already participating in the chat room are shifted to the new chat room at a predetermined rate. For example, when there is a chat room of Shibuya-ku, a second chat room of Shibuya-ku is generated, and about a half of the participants in the chat room of Shibuya-ku are shifted to the second chat room. The chat room divided in this way is finally determined as a chat room in which the user is to participate.

Alternately, in place of dividing the chat room, there may be arranged such that a new user is made to participate in an electronic bulletin board in the same area, and is made to wait there until there arises room in the chat room (step S7-11). In this case, the electronic bulletin board is a virtual space for users to write and read information, as has been known conventionally. Particularly, in the present system, it is preferable that the bulletin board is structured such that users can write and read information in voice, by taking into consideration the convenience and safety of the users who utilize the system while moving.

After the chat room has been finally determined as described above, a voice mixing processing is carried out for making the new user actually carry out the chat (step S7-12). It becomes possible to carry out a voice chat using the terminal 2 (step S7-13). This voice mixing processing will be described later. Then, steps S7-1 to S7-12 are repeated until when the user instructs to finish the chat (steps S7-14, S7-15).

Next, how an automatic changeover of a chat room is performed will be explained. When the current position of a user for transmission from the terminal 2 to the server device 1 has changed based on a move of the user on foot or on an automobile, there may be selected a new chat room different from the chat room so far the user has been participating in, at step S7-3. For example, when the current position from the terminal 2 has changed to the "- - - Shibuya-ku" at step S7-1, the "chat room of Shibuya-ku" is selected.

Next, how posting of a changeover is performed will be explained. The process shifts from step S7-6 to step S7-16, and sound data of an alarm sound (for example, a "chime sound") for posting a changeover of the chat room is obtained from the sound information DB 15. This sound data is transmitted to the terminal 2. Then, this alarm sound is output from the speaker of the terminal 2. Therefore, each user can know in advance that the chat room will be changed over. Thus, each user can prepare for this changeover. In this case, it may be arranged such that when the user wants to continue the participation in the current chat room, the user can refuse the changeover of the chat room. For example, it may be arranged such that the chat room is changed over only when there has been no request for maintaining the chat room from the terminal 2 within a predetermined period of time after the sound data of sound for posting the changeover has been transmitted. Only when there has been a request for maintaining the chat room, the chat room may be maintained in a similar manner to the manual selection of a chat room as described later.

After the changeover of the chat room has been posted to the user, the sound mixing is carried out for the new chat room at step S7-12. As a result, the chat room is changed over automatically. Therefore, the user can always participate in a chat room corresponding to the current position of the self, and thus can carry out conversations most relevant to the own status.

Figure 8:
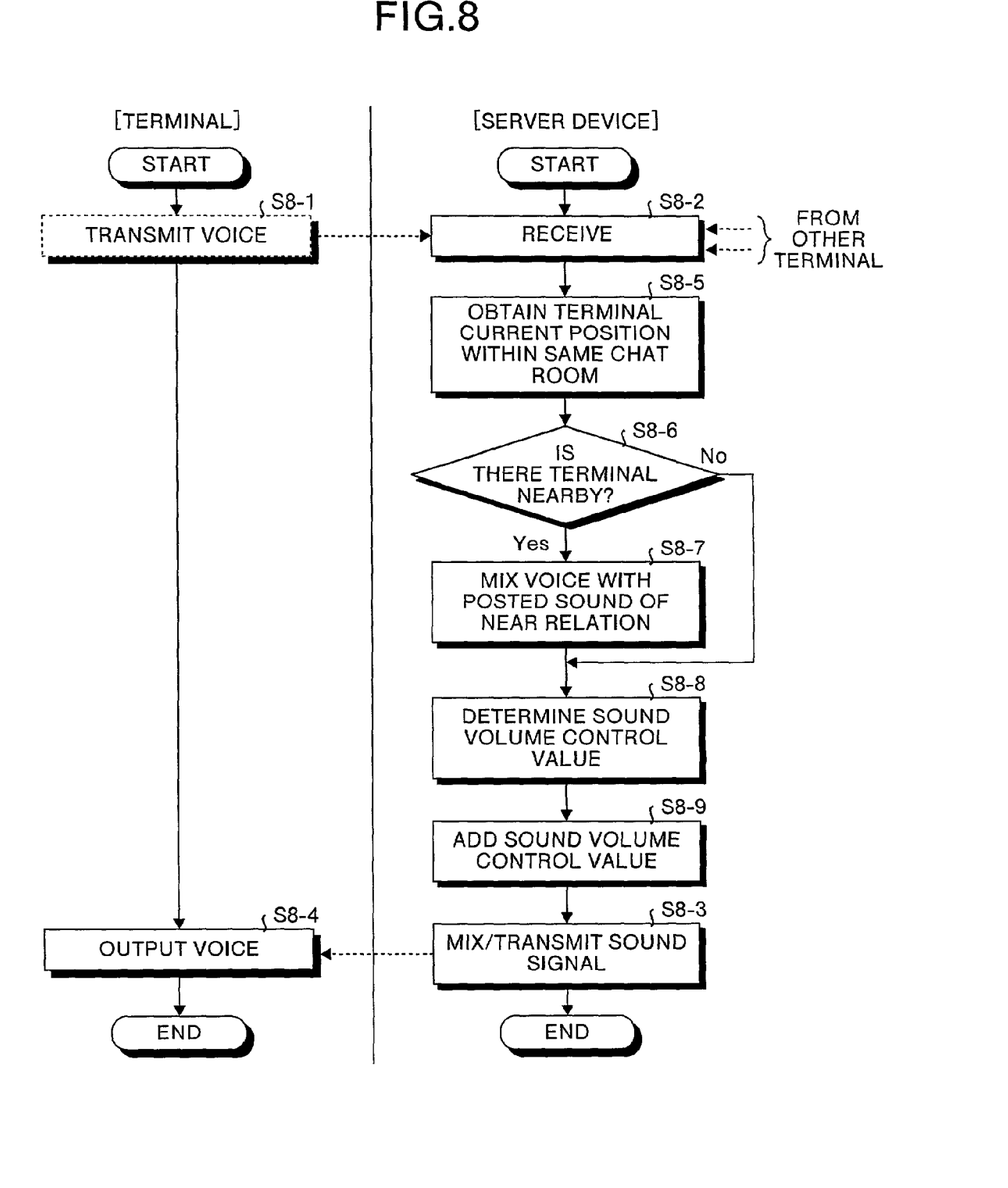
FIG. 8 is a flowchart of a sound mixing processing.

Next, how the sound mixing is carried out will be explained. Sound mixing processing carried out at step S7-12 and the contents of the voice chat carried out at step S7-13 will be explained. FIG. 8 is a flowchart of the sound mixing processing.

Basically, when sound data has been transmitted from each terminal 2 (steps S8-1, S8-2), the server device 1 mixes the sound data for each chat room, and transmits the result to each terminal 2 (step S8-3). Therefore, each user participating in the same chat room can listen to the conversations of other users and their background sounds (step S8-4). Accordingly, each user can carry out conversations with other users while moving. Particularly, as the other users having the conversations are in the same area as each user, the users can make the information at their positions as common topics. Thus, they can exchange information on shops around and traffic information. Further, as each user has conversations with persons whom the user has not met before, each user can meet various persons by accident, and can make new friends easily.

In this sound mixing processing, in order to promote the actual meeting among the users and to improve the live feeling, the following processing is carried out.

First, the current positions of the users participating in the same chat room are obtained at a predetermined interval from the current position information DB 12 (step S8-5). The inter-terminal distance calculator 18d calculates distances between the users. Then, a decision is made about whether these distances are within a predetermined distance or not. Based on this, the inter-terminal distance calculator 18d decides whether or not there are terminals 2 that are close to each other (step S8-6). When there are terminals 2 within a predetermined distance, sound data of voice (for example, a voice "there is a chat friend near the user") for informing these users that they are at positions close to other users is obtained from the sound information DB 15. When this sound data is mixed with the sound data to be transmitted to the user in the near relationship (step S8-7), the sound is output from the speaker of the terminal 2 (step S8-4). Thus, each user can know that there is a chat friend near the user. As a result, it becomes easy to make promise to meet each other, which promotes the actual meeting.

The sound controller 18g controls the sound volume of sound output from each terminal 2 according to the distance between the users calculated by the inter-terminal distance calculator 18d. Specifically, the sound controller 18g refers to the sound information DB 16 and determines a sound volume control value to be added to the sound data, based on the distance between the users calculated by the inter-terminal distance calculator 18d (step S8-8). Then, the sound controller 18g adds the sound volume control value to the header of the sound data to be transmitted to each terminal 2, according to a predetermined communication rule (step S8-9). Then, the sound controller 18g transmits the sound data to each terminal 2 (step S8-3). Then, when each terminal 2 outputs the sound (step S8-4), the sound output adjuster 20c analyzes the contents of the header of the sound data, and determines the output sound volume. Then, the sound amplifier not shown controls the amplification so that the sound is output based on this output sound volume. The sound volume control value has been determined such that the sound volume becomes relatively small when there is a long distance between the terminals 2, and the sound volume becomes relatively large when there is a short distance between the terminals 2, as described before. Therefore, each user can decide a distance to other user, based on the large or small size of the sound.

Figure 9:
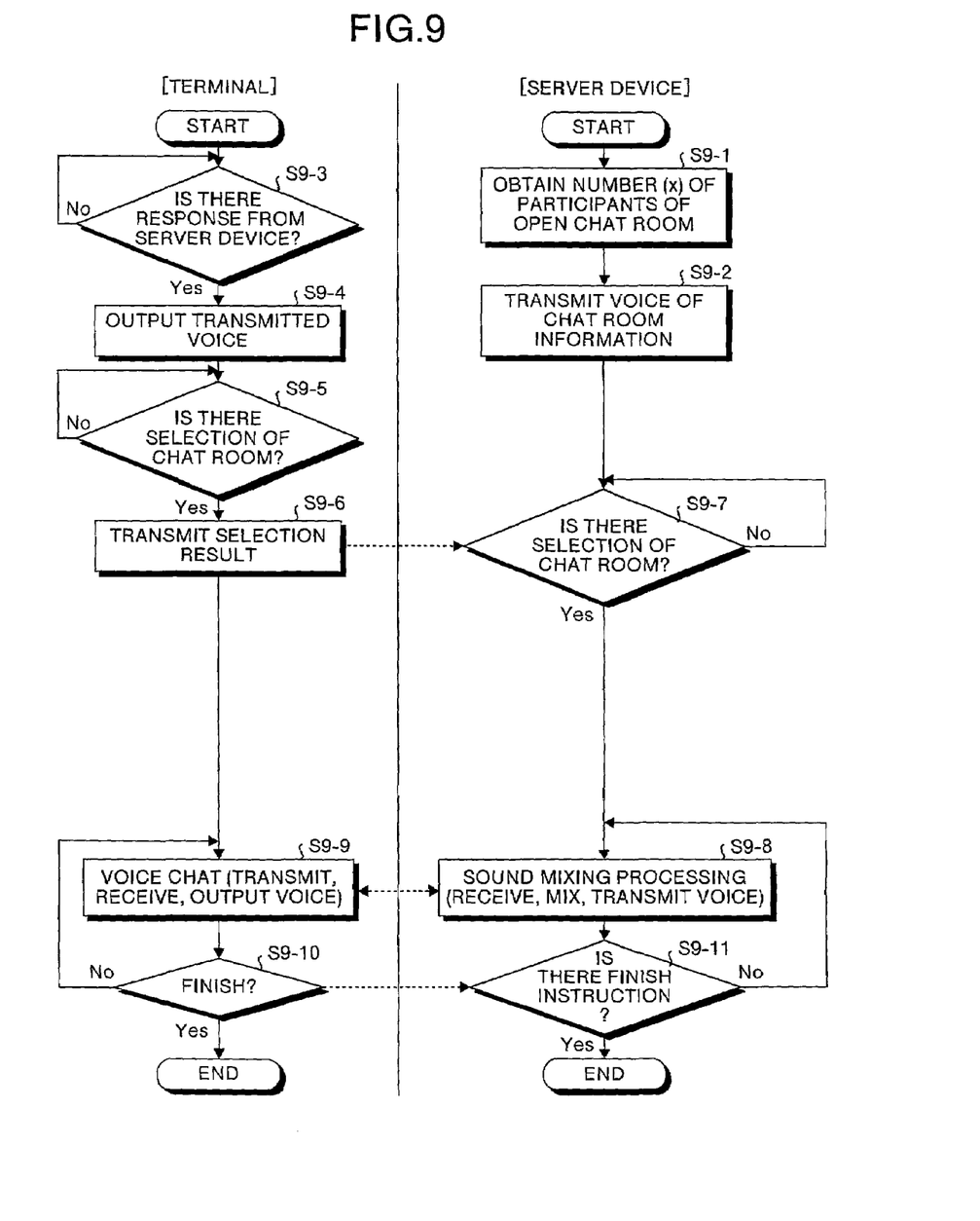
FIG. 9 is a flowchart of a chat processing in the case of a manual selection of a chat room.

Next, how manual selection of a chat room is performed will be explained. FIG. 9 is a flowchart of a chat processing in the case of a manual selection of a chat room.

When a manual selection has been selected, the chat information DB 13 is referred to under the control of the chat room selector 18c. Then, among the chat rooms that are open, chat room names of chat rooms in which a user can participate and a number x of participants in each chat room are obtained (step S9-1). Then, these pieces of information are posted to the user in voice (step S9-2).

In this case, the chat room in which a user can participate is a chat room that can be determined based on an optional standard, and that does not require a new generation, combination or division of the chat room (a chat room of 0<number of participants x≦a predetermined threshold value). Based on the provision of a limit to the selection range of a chat room, it becomes possible to reduce the load of the server device 1. It is of course possible to generate, combine or divide a chat room in a similar manner to that of the automatic selection for a selection from all the chat rooms, without providing such a limit.

A user who has listened to the posting of selectable chat rooms selects a chat room in which the user wants to participate from among the posted chat rooms, and inputs in the voice of this chat room (steps S9-3 to S9-6). Then, the server device 1 carries out a sound mixing processing for making the new user participate in this chat room (steps S9-7 to S9-9). The processing at these steps S9-8 and S9-9 can be carried out in a similar manner to that at steps S7-12 and S7-13 shown in FIG. 7. The sound mixing processing is repeated until when the user instructs to finish the chat (steps S9-10, S9-11). In the case of the chat based on the manual selection, the chat room is selected regardless of the current position of the user. Therefore, the chat room is not automatically changed over.

In this way, a user can manually select a chat room and participate in the selected chat room. Therefore, the user can easily participate in a chat room not necessarily relevant to the current position.

It is also possible to add various kinds of processing in order to increase the convenience of the voice chat.

For example, when one chat room has already been selected and conversations have been proceeded, it is also possible to carry out the sound mixing such that one or a plurality of other chat rooms are selected and the voices in the selected chat rooms are listened to. In this case, the user can listen to the voices in the interested chat rooms in addition to the chat room in which the user is actually participating. When the voices of the plurality of chat rooms are simply mixed, it becomes difficult to listen to the voices. Therefore, it is preferable that the sound volume of the chat rooms is made relatively smaller, or the sound quality is changed.

Further, in addition to the chat rooms, it is also possible to take in the sound of public information (a weather forecast, a road guide, an area guide, etc.) or a BGM at the server device 1 side, and mix this sound with the chat voice according to the request of the user. In this case, each user can listen to various kinds of public information while carrying out a voice chat, or can carry out a voice chat while listening to the BGM. Therefore, it is possible to further improve the convenience and the pleasantness of the voice chat.

Alternately, it is also possible to provide a processor for carrying out a sound effect processing in the server device 1 or at the terminal 2, and carry out an optional sound effect processing to the own voice or the voices transmitted from other users. In this case, when a voice chat is carried out in voice quite different from the actual voice, it is possible to carry out communications anonymously.

It is also possible to transmit self-introduction information of other users according to the request of each user. For example, the server device 1 refers to the registered information DB 10 and the chat information DB 13, and posts in voice the handle name of other user of the chat room in which the user is participating, based on the instruction of each user. When the user has selected a handle name and has instructed to extract the self-self introduction information, the server device 1 extracts the sound data of the self-introduction information of the user corresponding to this handle name from the registered information DB 10, and transmits the extracted information to the user. In this case, as each user can listen to the self-introduction of other users, the user can reflect this information into the contents of the voice chat.

It is also possible to carry out individual conversations with one or a plurality of other users according to the request of the user. For example, the server device 1 posts the handle name of other user based on the instruction of each user in the manner as described above. When the user has selected a handle name and instructed to carry out an individual conversation in a voice command, the server device 1 posts a voice to the user corresponding to this handle name to request this user to approve the individual conversation. When the user who has been requested to approve the individual conversation posts a voice to approve this, it becomes possible to carry out the individual conversation between this user and the user who desired the individual conversation.

This individual conversation can be achieved based on various methods. For example, it is possible to achieve a chat room in which only both persons can participate. Alternately, it is possible to establish communications between normal mobile communication terminals. In this case, each user can carry out an individual conversation with other user. Therefore, it is possible to carry out a secret conversation easily.

However, in the case of carrying out an individual conversation, there is a case where it is not preferable that the connection to the chat room in which the user has so far been participating is disconnected. Therefore, it is preferable to arrange such that the user can carry out an individual conversation while enabling the user to maintain the participation in the chat room in which the user has so far been participating.

This system can be achieved based on the following. For example, the voice from the user who has agreed to the individual conversation is locked so that this voice is transmitted to only the terminal of the user who carries out the individual conversation. At the same time, the voice of the chat room in which the user has so far been participating is mixed such that the user who carries out the individual conversation can only listen to this voice.

The structure of "only the listening" is possible is made for the following reason. It is difficult to discriminate the voice transmitted from the terminal of the user who carries out the individual conversation whether this voice is the voice for carrying out the individual conversation or this voice is the voice for speaking in the chat room. Therefore, a decision is made such that all the voices are for the individual conversation, thereby to prevent the voice from being mixed as the voice to the chat room.

However, when it is possible to discriminate between the two, it may be arranged such that the voice for the individual conversation is transmitted to only the terminal of the user who has agreed to the individual conversation, and the voice for the chat room is mixed with the voice of the chat room as has been carried out. The above discrimination can be achieved as follows. For example, a decision is made that basically all the voices are for the chat room, and only the voice issued while depressing a specific button of the terminal 2 is decided as the voice for the individual conversation. Alternately, it is possible to decide such that only the voice of a sound volume at or above a predetermined threshold value is for the individual conversation. It is also possible to decide such that only the voice within a predetermined period of time after a predetermined voice command has been issued is the voice for the individual conversation.

One embodiment of the present invention has been explained above. However, the present invention is not limited to the contents shown in this embodiment, and it is also possible to implement the present invention in various different modes within the range of the technical idea described in the scope of claim for a patent.

For example, the standard of dividing a chat room and the method of selecting a chat room are not limited to the above contents, and it is also possible to employ other standard of dividing a chat room and other method of selecting a chat room.

Further, in addition to the above-described various kinds of processing, it is also possible to add other different kinds of processing. For example, it is possible to add a charge processing for charging each user at the time of carrying out a chat.

Further, as the network for connecting between the server device 1 and the terminals 2, it is also possible to utilize an optional network other than the above-described Internet 3. For example, it is also possible to build up a system similar to that of the above embodiment by using a LAN, a WAN or a personal computer communication network within a limited area.

In addition to the above, it is also possible to optionally modify the processing steps, control steps, detailed names and numerical values shown in the documents and the drawings, except where a special note is provided.

As explained above, according to the present invention described, each user can carry out a chat in voice with other users who are at positions relevant to a current position of the self. As a result, it is possible to spend the moving time more pleasantly and meaningfully. It is possible to talk on various background scenes that change along the movement, and to obtain detailed knowledge from persons familiar with these places. Based on the chat in voice, it is possible to search persons around and directly talk to them, and to have communications with an unspecified number of the general public by chance.

Furthermore, a user can participate in any one of hierarchically generated chat rooms. Therefore, the user can participate in various hierarchical chat rooms according to the own needs, and can achieve further diversified communications.

Furthermore, the chat room control unit generates chat rooms based on a purpose of each user. Therefore, the user can participate in a chat room that matches the own purpose.

Furthermore, a user can always participate in a chat room in which a suitable number of users are participating. As a result, in the case of carrying out a voice chat, it is possible to achieve satisfactory communications without generating a disturbance in the listening of voices.

Furthermore, each user can participate in a chat room corresponding to a current position of the self. For example, it is possible to obtain information on a restaurant in front of a user. Thus, each user can easily obtain various kinds of information relating to the current position of the self.

Furthermore, each user can participate in a chat room corresponding to a position of a move destination of the self. For example, each user can easily obtain various kinds of information relating to a move destination of the self, like a congestion status of a proceeding direction of an automobile, for example.

Furthermore, each user can always participate in a chat room corresponding to a current position of the self. As a result, it is possible to maintain an optimum dialogue environment, without the need for a manual changeover of a chat room.

Furthermore, each user can know in advance that the chat room will be changed over. As a result, each user can arrange the contents of conversations or stop the changeover depending on the situation. Thus, it is possible to prepare for the changeover.

Furthermore, for example, a voice of a person far from each user is output in a small sound volume, and the voice is output gradually in a larger sound volume as this person comes closer. As a result, it is possible to sense the feeling of far and close distances based on the sound volume. This makes it possible to achieve further realistic communications.

Furthermore, when there is other user near each user, the user can easily know this fact. As a result, it is possible to talk to this user directly, thereby to improve the actual communications.

Furthermore, each user can listen to the contents of conversations of the plurality of chat rooms at the same time. As a result, the user can participate in a plurality of chat rooms at the same time, or to listen to the contents of conversations of other chat rooms in order to study the participation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A position-linked chat system, comprising a plurality of terminals connected to a server through a network, wherein said server includes:
   a chat room control unit for generating a plurality of chat rooms based on a geographical standard;
   a chat room selecting unit for selecting among the generated chat rooms, a chat room in which a user at each terminal is to participate, based on information being transmitted from said terminal and relating to the current position of said terminal;
   a sound control unit for mixing voices transmitted via the terminals of the users who participate in the same chat room; and a future position estimating unit for estimating a future position of at least one of said terminals based on a change in the current position of said at least one terminal, wherein said chat room selecting unit selects, among the generated chat rooms, a chat room corresponding to the future position estimated by said future position estimating unit, as the chat room in which the user at said at least one terminal is to participate.

2. A position-linked chat method of providing a chat service to users at a plurality of interconnected terminals, said method comprising the steps of:
   generating a plurality of chat rooms based on a geographical standard;
   selecting, among the generated chat rooms, a chat room in which a user at each terminal is to participate, based on information being posted from said terminal and relating to the current position of said terminal; and
   mixing voices transmitted via the terminals of the users who participate in the same chat room;
   wherein said selecting step comprising estimating a future position of at least one of said terminals based on a change in the current position of said at least one terminal, wherein a chat room corresponding to the estimated future position is selected, among the generated chat rooms, as the chat room in which the user at said at least one terminal is to participate.

3. A computer-readable medium recorded with a program for providing a chat service to users at a plurality of interconnected terminals, said program including sequences of instructions which, when executed by a processor, cause said processor to perform the steps of:
   generating a plurality of chat rooms based on a geographical standard;
   selecting, among the generated chat rooms, a chat room in which a user at each terminal is to participate, based on information being posted from said terminal and relating to the current position of said terminal; and
   mixing voices transmitted via the terminals of the users who participate in the same chat room;
   wherein said selecting step comprising estimating a future position of at least one of said terminals based on a change in the current position of said at least one terminal, wherein a chat room corresponding to the estimated future position is selected, among the generated chat rooms, as the chat room in which the user at said at least one terminal is to participate.

4. A computer program product including computer instructions on a server for providing a chat service to users at a plurality of terminals connected to said server through a network, the computer instructions including instructions for performing the steps of:
   generating a plurality of chat rooms based on a geographical standard;
   selecting, among the generated chat rooms, a chat room in which a user at each terminal is to participate, based on information being posted from said terminal and relating to the current position of said terminal; and
   mixing voices transmitted via the terminals of the users who participate in the same chat room;
   wherein said selecting step comprising estimating a future position of at least one of said terminals based on a change in the current position of said at least one terminal, wherein a chat room corresponding to the estimated future position is selected, among the generated chat rooms, as the chat room in which the user at said at least one terminal is to participate.

5. A position-linked chat system, comprising a plurality of terminals connected to a server through a network, wherein said server includes:
   a chat room control unit for generating a plurality of chat rooms based on a geographical standard;
   a chat room selecting unit for selecting, among the generated chat rooms, a chat room in which a user at each terminal is to participate, based on information being transmitted from said terminal and relating to the current position of said terminal;
   a sound control unit for mixing voices transmitted via the terminals of the users who participate in the same chat room; and
   an inter-terminal distance calculating unit which calculates distances between the terminals based on the current position of each terminal.

6. The position-linked chat system according to claim 5, wherein said sound control unit controls the volume of sound output from each terminal according to the distances calculated by said inter-terminal distance calculating unit.

7. The position-linked chat system according to claim 5, wherein when the distances calculated by said inter-terminal distance calculating unit are within a predetermined range, said sound control unit posts to the terminals within said range a message that the users at said terminals are close to each other.

8. A position-linked chat method of providing a chat service to users at a plurality of interconnected terminals, said method comprising the steps of:
   generating a plurality of chat rooms based on a geographical standard;
   iteratively obtaining the current position of each terminal based on information being transmitted from said terminal and relating to the current position of said terminal;
   selecting, among the generated chat rooms, a chat room in which a user at each terminal is to participate, based on the iteratively obtained current position of said terminal;
   mixing voices transmitted via the terminals of the users who participate in the same chat room; and
   calculating distances between the terminals based on the current position of each terminal.

9. The method of claim 8, further comprising the step of controlling the volume of sound output from each terminal according to the distances calculated in said calculating step.

10. The method of claim 8, further comprising the step of informing, when the distances calculated in said calculating step are within a predetermined range, the users at the terminals within said range that they are close to each other.

11. A position-linked chat method of providing a chat service to users at a plurality of interconnected terminals, said method comprising the steps of:
   generating a plurality of chat rooms based on a geographical standard;
   iteratively obtaining the current position of each terminal based on information being transmitted from said terminal and relating to the current position of said terminal;
   selecting, among the generated chat rooms, a chat room in which a user at each terminal is to participate, based on the iteratively obtained current position of said terminal;
   mixing voices transmitted via the terminals of the users who participate in the same chat room; and transferring a user from the chat room in which said user is currently participating to another chat room according to a change in the current position of the terminal of said user;

wherein said transferring is performed without terminating the chat session of the user being transferred.

12. A position-linked chat method of providing a chat service to users at a plurality of interconnected terminals, said method comprising the steps of:

generating a plurality of chat rooms based on a geographical standard;

iteratively obtaining the current position of each terminal based on information being transmitted from said terminal and relating to the current position of said terminal;

selecting, among the generated chat rooms, a chat room in which a user at each terminal is to participate, based on the iteratively obtained current position of said terminal;

mixing voices transmitted via the terminals of the users who participate in the same chat room; and transferring a user from the chat room in which said user is currently participating to another chat room according to a change in the current position of the terminal of said user;

wherein said transferring is performed automatically unless the user to be transferred has chosen to stay in the current chat room.

13. A position-linked chat method of providing a chat service to users at a plurality of interconnected terminals, said method comprising the steps of:

generating a plurality of chat rooms based on a geographical standard;

iteratively obtaining the current position of each terminal based on information being transmitted from said terminal and relating to the current position of said terminal;

selecting, among the generated chat rooms, a chat room in which a user at each terminal is to participate, based on the iteratively obtained current position of said terminal;

mixing voices transmitted via the terminals of the users who participate in the same chat room;

transferring a user from the chat room in which said user is currently participating to another chat room according to a change in the current position of the terminal of said user; and warning the user that the current chat room is about to change, wherein said transferring is performed automatically unless the user to be transferred has chosen to stay in the current chat room in response to said warning.

14. A server for use in a position-linked chat system in which said server communicates with a plurality of terminals through a network, the server comprising:

a chat room control unit for generating a plurality of chat rooms based on a geographical standard;

a chat room selecting unit for selecting, among the generated chat rooms, a chat room in which a user at each terminal is to participate, based on information being transmitted from the terminal and relating to the current position of the terminal;

a sound control unit for mixing voices transmitted via the terminals of the users who participate in the same chat room; and a future position estimating unit for estimating future position of at least one of the terminals based on a change in the current position of said at least one terminal, wherein the chat room selecting unit further selects, among the generated chat rooms, a chat room corresponding to the future position estimated by the future position estimating unit, as the chat room in which the user at said at least one terminal is to participate.

* * * * *